Figure 1:
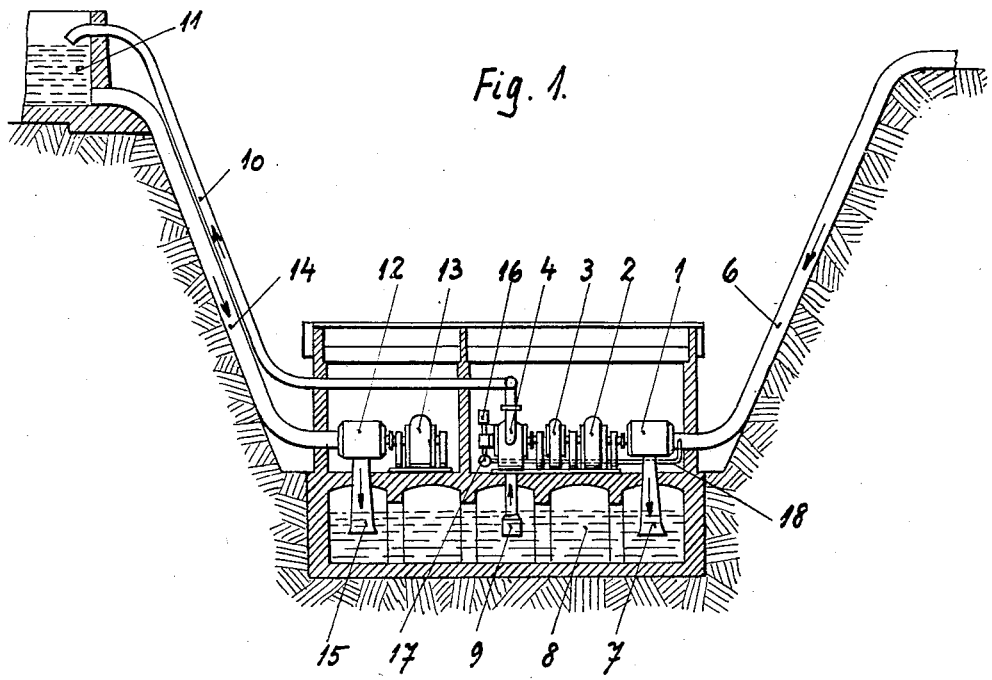

Nov. 4, 1930.    G. BAUER ET AL    1,780,613
REGULATING DEVICE FOR LIQUID COUPLINGS
Filed Nov. 5, 1926    2 Sheets-Sheet 2

Patented Nov. 4, 1930

1,780,613

UNITED STATES PATENT OFFICE

GUSTAV BAUER AND CARL SCHMIESKE, OF HAMBURG, GERMANY

REGULATING DEVICE FOR LIQUID COUPLINGS

Application filed November 5, 1926. Serial No. 146,551.

Our invention relates to a regulating device for liquid couplings designed as Föttinger couplings and intended for use especially in connection with storing pumps for hydro-electric plants.

The object of storing pumps co-operating with hydro-electric plants is to pump superfluous water into an elevated reservoir from which it is withdrawn and conducted to a hydraulic turbine during those periods of time in which the consumption of electric energy is greatest, the dynamo machine connected with, and driven by, that turbine generating the current for the peak consumption. Storing pumps are employed, therefore, especially in such plants where a dam reservoir cannot be provided and, on the one hand, a large amount of water flows away unutilized during day-time when the consumption of electric energy is small, whereas, on the other hand, the available amount of water is not sufficient to produce the larger amount of electric energy required at night-time or at other times when considerably more electric current than usual is required.

Connecting the storing pumps with, and disconnecting them from, the respective shafts must be possible at every moment and with every load. The couplings employed in connection with said pumps are, as a rule, liquid couplings of the Föttinger type as with couplings of this type it is rendered possible to connect them with, or disconnect them from, the respective pumps merely by filling or emptying them, and to accommodate them to the load existing at the time being being by filling or emptying them more or less. Regulating such a plant according to the load on it, and connecting the storing pump with, and disconnecting it from, the appertaining shaft or shafts necessitates, however, very great attention on the part of the attending engineer, and endeavors have, therefore, been made to render the regulation automatic as much as possible, doing away, therefore, as much as possible with actions to be effected by the attending engineer.

The problem is solved completely by the present invention, the gist of which resides therein that the regulation of the liquid coupling is effected by having the inlet valve or inlet slide valve and the outlet valve or outlet slide valve controlled by a governor that is dependent on the load on the main driving engine. The arrangement and combination of the parts is such that for instance in the case of a sudden relief of the engine, whereby the number of revolutions of this engine increases, the inlet valve or inlet slide valve is adjusted to admission, and the appertaining feed or supply passages are opened. The circuits in the couplings are then filled automatically from the main supply channel until the driving engine has attained its normal number of revolutions. There are provided, besides, special apertures in the inlet control valve and at the outer circumference of the circuit, a predetermined amount of water flowing continually through said apertures and through the coupling when this is filled either completely or only partly; the object of that amount of water is to abstract continually the heat arising within the coupling.

Furthermore, a separate conduit is provided, with the aid of which the outlet slides are kept closed continually by means of the pressure of the water which is constantly supplied. Also a separate auxiliary slide valve is provided, by means of which said separate conduit can be closed or opened according as the driving engine is being relieved or overloaded. If the water is supplied to the circuit of the liquid coupling through the hollow shaft from the end of the same, the said auxiliary slide valve is arranged preferably also within that hollow shaft, the control of this slide valve being then effected together with that of the inlet and outlet slide valve by the governor that is dependent upon the main engine, and if the engine has become overloaded resulting in a decrease of the number of revolutions the inlet slide valve will be moved, thus closing the inlet openings, whereas the auxiliary slide valve is so shifted as to close the pressure conduit leading in the direction to the outlet slide valves, whereby it is rendered possible that the liquid can escape as these valves are now being opened. This proceeds, however, only until the normal number of revolutions has been attained whereafter, during the further increase of the number of revolutions, the auxiliary slide valve is shifted again backwardly by the governor in order to free the pressure conduit leading in the direction to the outlet slide valves, in consequence whereof these latter will be closed and the coupling continues to operate with a corresponding slip.

Figure 3:
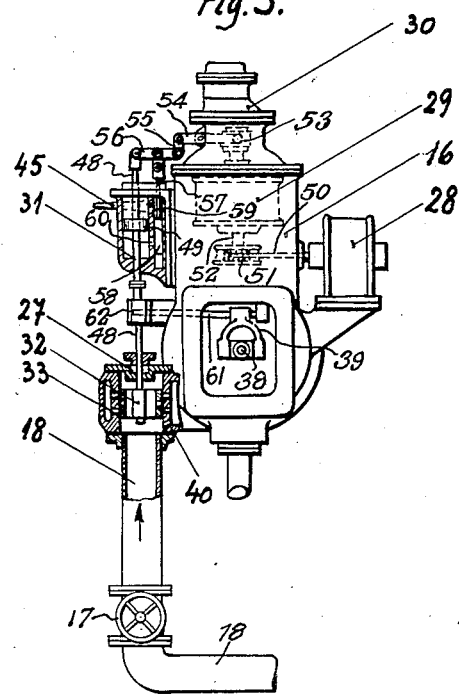
Figure 2:
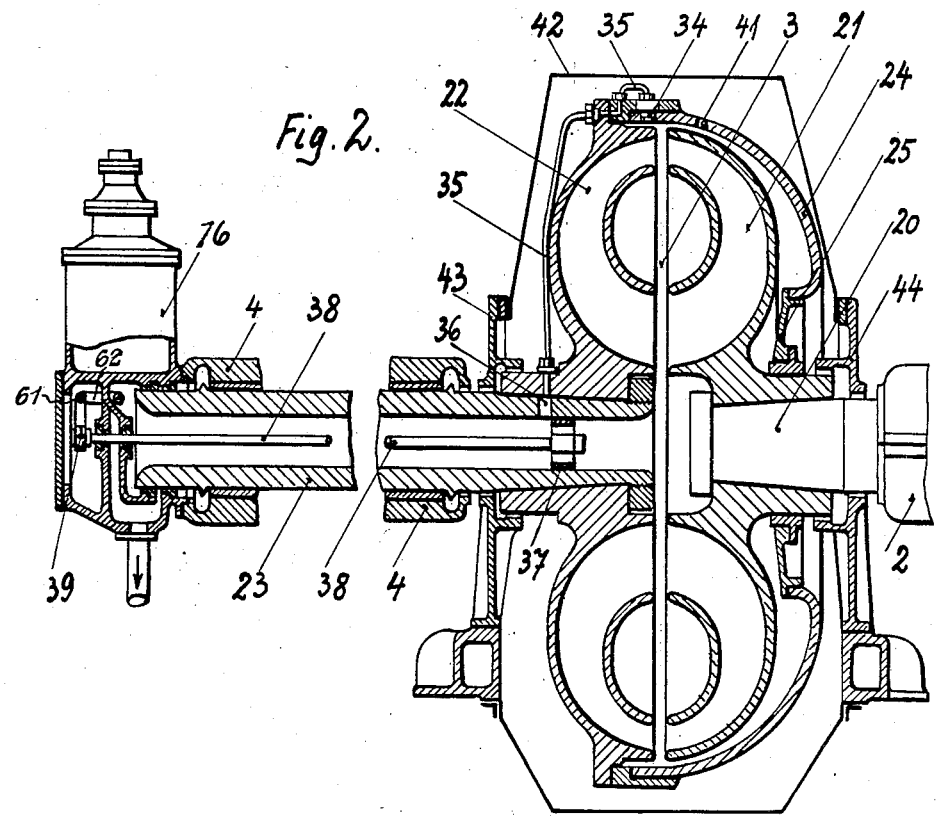
Figure 4:
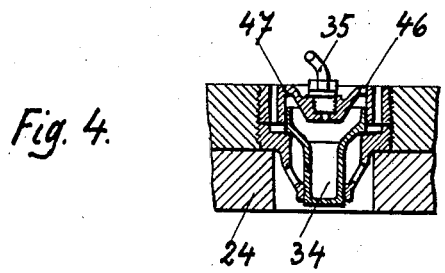

The invention is illustrated diagrammatically and by way of example on the accompanying drawings on which Figure 1 is a vertical section through a complete plant designed according to this invention, Figure 2 an axial section through one of the liquid couplings of the plant, together with a portion of the pump shaft and the governor, Figure 3 a separate view of the governor, partly in section, the plane of vision lying at right angles with respect to that of Fig. 2, and Figure 4 an axial section through an outlet slide valve drawn to a still more enlarged scale.

In the drawing, Fig. 1, 1 denotes a hydraulic turbine which drives the dynamo machine 2 by means of the water supplied under pressure through the conduit 6. The waste water flows into the tail water channel 8 through the outlet branch 7. On the other side of the dynamo machine or electric generator 2 a liquid coupling 3 is provided by means of which a storing pump 4 can be connected with, or disconnected from, said generator. The speed of rotation of the electric motor 28 is controlled by a generator mounted upon the shaft of the turbine 1 or also by means of the generator 2 shown in the drawing.

12 denotes another hydraulic turbine, and 13 another dynamo or electric generator. The turbine 12 is supplied with water from the overhead reservoir 11 through the conduit 14, and the waste water flows through the branch 15 into the tail water channel 8. This second set (12 and 13) is intended solely as an additional set (to 1 and 2) for use in the periods of large consumption of electric energy, whereas in the other periods the storing pump 4 is employed to pump water from the channel 8 up to and into the reservoir 11 in order to utilize the superfluous power of the turbine 1, as well as the otherwise uselessly discharged water. 10 denotes the conduit leading from the pump 4 to the reservoir 11. The water stored in this reservoir can be used afterwards, during the peak periods, for generating electric energy in the dynamo machine 13.

The liquid coupling 3 is regulated by the governor 16. The water is conducted to the coupling through a pipe 18 connected with the conduit 6. 17 denotes a shut-off valve or slide-valve for said pipe 18. The valve 17 may be operated by hand independently from the piston 32 which forms a part of the inlet slide-valve 27 and serves solely as an ordinary closing device for the water supply conduit 18 and will be necessary in case the slide valve 27 is put out of operation for the purpose of overhauling, repairing or the like. The valve 17 which is indicated in Fig. 1 is more fully shown in Fig. 3 together with the adjoining pipe conduit 18.

The governor 16 shown in Fig. 1 corresponds to the governor 16 with the servo-motor 31 as shown in Figs. 2 and 3. Fig. 3 shows a section through said servo-motor in order to explain the mode of operation of the regulating device.

The coupling 3 is shown on a greatly enlarged scale (relatively to Fig. 1) in Fig. 2. In this figure 20 denotes an end of the shaft of the armature of the dynamo machine 2, 21 the driving half of the coupling, and 22 the driven half, which is firmly secured to the pump shaft 23. 24 denotes the coupling cover which covers the half 21 of the liquid coupling and is packed with respect to the hub thereof by a stuffing box 25, whereas its rim is firmly connected with the rim of the half 22 of said coupling.

The pump shaft 23 is hollow and communicates at its inner end with the interior of the liquid coupling. At the other end of said shaft the governor 16 and the inlet slide valve 27 (Fig. 3) are provided. The governor comprises an electric motor 28, pendulums with centrifugal balls (indicated by the numeral 29), an oil pump 30, and servo-motor 31. The electric motor 28 serves for driving the centrifugal device 29 which serves for adjusting the slide valve 37 or the piston 32 by way of the servo-motor. The speed of rotation of the electric motor 28 is dependent upon the speed of rotation of the turbine 1. This dependency may be effected in the well known manner either by mechanical means, such as cog-wheels, rods or the like, or also in an electrical way. The governor 16 is in no operative connection with the shaft 23 of the pump, the casing of said governor being fastened to the front part of the bearing of the storage pump 4. Below the governor 16 the inlet slide valve with the appertaining piston 32 and the inlet passages 33 is attached to a downwardly directed extension of the servo-motor shaft 31. The passages 33 communicate with the bore of the pump shaft 23.

Where the driven half 22 of the coupling and the cover 24 are connected with each other, that is, at the circumference of the liquid coupling, the outlet slide valves 34 are provided, the details of which are shown in Fig. 4. These valves communicate with the bore of the pump shaft by means of apertures 36 of this latter, and of pipes 35 extending from these apertures to said valves, and this being so, the said valves are, or can be, subjected to the pressure of the water.

Within the pump shaft bore an annular slide valve 37 is provided which can be shifted by the governor 16 by the intermediary of a bell-crank lever 39 and a rod 38 whereby the apertures 36 and the pipes 35 can be connected to or disconnected from the pump shaft bore.

The mode of operation of the regulating device shown in Fig. 3 will be as follows: The centrifugal governor 29 will be rotated by the motor 28 by way of the shaft 50, the worm gear 51 and the shaft 52 and according to the deflection of the governor the controlling piston 58 of the servo-motor will be adjusted by means of the head 53, the levers 54, 55 and 56 and the piston rod 57. By this according to the position of the piston 58 the oil may be carried from the pump 30 through the openings 59 and 60 into the servo-motor above or below the piston 49, so as to displace accordingly the piston 32 of the inlet control valve 27 by way of the piston rod 48 thus opening and closing the inlet channels 33.

Adjustment of the piston 32 of the inlet valve 27 or the piston 49 of the servo-motor connected therewith may now also be effected by hand by means of the hand lever 45 which is provided laterally on the cylinder of the servo-motor and transmits motion to the piston rod 48 by means of a cam or similar device. Motion of the piston rod 48 is likewise transmitted to the interior slide valve 37 by way of the lever 62, the shaft 61 and the fork 39 which engages with the valve rod 38.

The governor controls the filling of the coupling as above mentioned in such a manner that in case of an increase of the load the coupling will be accordingly emptied while being filled in case of a decrease of the load.

The guide wall for the control piston 32 of the inlet slide-valve 27 is provided with apertures 40, and the cover 24 of the liquid coupling 3 is provided with apertures 41 whereby it is rendered possible that water can flow continually through the coupling in order to cool it, irrespective of whether it is completely filled or only partly filled.

The entire coupling is enclosed in a protective casing 42 packed at the shafts concerned by means of stuffing boxes 43 and 44.

The manner of operation of the plant and the co-operation of the members described is as follows:

Supposing, the turbine 1 be driving solely the dynamo machine 2, and the storing pump 4 be now to be driven also, that is to say, the liquid coupling 3 be to be filled, first the slide valve 17 of the pipe 18 is opened by hand, whereafter the control-gear of the servo-motor is so re-adjusted by the hand-lever 45 (Fig. 3) that the piston 32 uncovers the apertures 33, and water can enter into the circuit of the liquid coupling 3 through the hollow shaft 23. The valve 17 is regulated during operation of the plant by means of the governor 16. As soon as the liquid coupling has been filled sufficiently the pump 4 will be driven by this coupling. The slide valve 17 serving as inlet valve is only actuated during manual starting by means of the hand lever 45, while regulating during operation of the plant is accomplished, as mentioned herein by means of said governor 16.

As long as the service proceeds in normal manner, the apertures 33 are kept closed by the slide valve 27. The liquid coupling is filled either wholly or only partly during that time, and only as much water is flowing through the apertures 40 as corresponds to the losses by leakage. The outlet slide-valves 34 are kept closed during that time by the pressure of the liquid present in the pipes 35, these pipes communicating now with the pump shaft bore through the apertures 36. For this purpose the outlet slide valves 34 are so dimensioned that during operation of the plant pressure water which may be carried through the said apertures 36 and the pressure pipes 35 to said valves, will exert a pressure on said valves 34 from the outside, thus tightening the same against the pressure prevailing in the interior. After adjusting the valves 37 by means of the governor 16 the apertures 36 and the pressure pipes 35 will be closed up and the pressure prevailing exteriorly of the valves 34 will now disappear by reason of the fact that the water discharges towards the outside through the apertures 46, shown in Fig. 4. By this now the pressure prevailing at the interior will be able to open the valves 34 so that the water may discharge from the interior of the coupling by action of centrifugal force. After re-adjustment of the valve 37 accomplishes the opening of the passages or apertures 36, pressure water will again pass to the valves 34 so that these valves will be closed by action of the exterior over-pressure.

If the turbine 1 should become overloaded, in consequence whereof the number of revolutions of the small electric motor 28 of the governor 16 will decrease, the fly-ball pendulums and the servo-motor will be so influenced that the piston 32 is shifted, but does not, nevertheless, open the inlet passages 33, but the slide-valve 37 is moved so much that it closes the apertures 36, whereby the pipes 35 are disconnected from the pump shaft bore. The pressure that existed up to then in the pipes 35 will be reduced because the water is thrown out through the apertures 46 (Fig. 4) of the casings 47 of the outlet slide-valves 34, and this being so, the slide members proper of these valves move outwards and establish a communication between the interior of the liquid coupling and the outlet passages also provided in said casings, in consequence whereof the water enclosed within the coupling escapes through said passages. This escape takes place, however, only until the normal number of revolutions has again been reached. This having been attained, the slide-valve is again withdrawn from the apertures 36 by the governor, and the pump shaft bore communicates again with the pipes 35 and the outlet slide-valves which are now again closed by the pressure of the water, as has already been described.

When the turbine 1 is relieved, and the number of revolutions consequently rises, the governor 16 adjusts itself to complete admission. The piston 32 of the inlet slide-valve now opens the inlet apertures 33 through which the water now can flow freely, in consequence whereof the coupling is supplied again with water, this being continued until the normal number of revolutions has again been attained. Then the passages 33 are again closed.

We claim:

1. A regulating device for liquid couplings, especially for driving storing pumps of hydro-electric power plants, comprising, in combination with the main driving engine of the plant, the liquid coupling and inlet and outlet slide valves thereof: a governor dependent upon the load on said main driving engine, and means for transmitting movement from said governor to said valves so as to fill and empty said coupling upon decrease and increase, respectively, of the load of said engine.

2. A regulating device for liquid couplings, especially for driving storing pumps of hydro-electric power plants, comprising, in combination with the main driving engine of the plant, the liquid coupling and inlet and outlet slide valves thereof: a governor dependent upon the load on said main driving engine, means for transmitting movement from said governor to said valves, said inlet slide-valve being adjusted by the governor for filling the coupling when the said driving engine is relieved and the number of revolutions increases, and means for maintaining this state, until the driving engine has again attained its normal number of revolutions, substantially as set forth.

3. A regulating device for liquid couplings, especially for driving storing pumps of hydro-electric power plants, comprising, in combination with the main driving engine of the plant, the liquid coupling and inlet and outlet slide valves thereof: a governor dependent upon the load on said main driving engine, means for transmitting movement from said governor to said valves, said inlet slide-valve, firstly, being adapted to co-operate with the governor in such a manner that it is adjusted for filling when said driving engine is relieved and the number of revolutions increases, and means for maintaining this state until the driving engine has again attained its normal number of revolutions, said inlet slide valves, secondly, having separate apertures, similar separate apertures being provided at the circumference of the liquid coupling, said two sets of apertures permitting cooling water to pass continually through the liquid coupling when filled completely or partially, substantially as set forth.

In testimony whereof we affix our signatures.

Dr. GUSTAV BAUER.
CARL SCHMIESKE.